(12) United States Patent
Chen et al.

(10) Patent No.: US 10,972,024 B1
(45) Date of Patent: Apr. 6, 2021

(54) MOTOR DRIVING DEVICE AND METHOD

(71) Applicant: ANPEC ELECTRONICS CORPORATION, Hsinchu (TW)

(72) Inventors: Kun-Min Chen, Hsinchu (TW); Yi-Cheng Liu, New Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/720,137

(22) Filed: Dec. 19, 2019

(30) Foreign Application Priority Data

Sep. 19, 2019 (TW) .................................. 108133891

(51) Int. Cl.
*H03K 5/00* (2006.01)
*H02P 6/15* (2016.01)

(52) U.S. Cl.
CPC .................................... *H02P 6/157* (2016.02)

(58) Field of Classification Search
CPC .......... H02P 6/157; H02P 6/182; H02P 27/08; H02P 6/28; H02P 7/29; H02P 6/14
See application file for complete search history.

(56) References Cited

U.S. PATENT DOCUMENTS

2006/0152181 A1* 7/2006 Shao ..................... H02P 6/182
318/400.34

* cited by examiner

*Primary Examiner* — Karen Masih
(74) *Attorney, Agent, or Firm* — Li & Cai Intellectual Property (USA) Office

(57) ABSTRACT

A motor driving device includes a PWM signal generating unit, a control unit, a driving unit, a floating point selecting unit and a BEMF detecting unit. The PWM signal generating unit generates an input PWM signal having a duty cycle according to a rotation speed command. The control unit generates a driving signal having multiple phases and an output PWM signal. The floating point selection unit selects a floating phase of the motor that is not turned off, and the BEMF detecting unit receives detects the BEMF of the floating phase during ON times or OFF times of the output PWM signal, so as to output a commutation signal in response to zero crossing events occurring in the BEMF. The control unit controls the BEMF detecting unit to detect the BEMF of the floating phase under the ON times or the OFF times of the output PWM signal.

20 Claims, 7 Drawing Sheets

MOTOR DRIVING DEVICE AND METHOD

CROSS-REFERENCE TO RELATED PATENT APPLICATION

This application claims the benefit of priority to Taiwan Patent Application No. 108133891, filed on Sep. 19, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving device and method capable of respectively performing back electromotive force detections during ON and OFF times of a PWM signal in accordance with motor parameters.

BACKGROUND OF THE DISCLOSURE

Direct current (DC) brushless motors are common motors that have advantages of high efficiency, lightness, thinness, shortness, and smallness, and thus are widely used in various fields. In existing electronic products, such as personal computers, notebook computers, communication devices, and household appliances, DC brushless motors are widely used. For example, fan motors for various electronic products and spindle motors for computer storage devices utilize the DC brushless motors. In general, when driving a DC brushless motor, a position of a rotor of the motor must be detected to properly drive commutation switches for performing a commutation procedure.

An existing brushless DC motor system typically includes a three-phase brushless DC motor, a Hall sensor, and a driver. However, since the Hall sensor is easily affected by external environments, a sensing accuracy may be lowered, and may even malfunction in some environments (for example, an environment with an excessive temperature). On the other hand, the brushless DC motor system further includes the Hall sensor, and a volume of the system and manufacturing costs are therefore increased. Therefore, a sensorless driving method without using a sensor is further proposed.

In the existing sensorless driving method, commutation timings are determined by detecting a back electromotive force (BEMF) during ON times of a PWM signal. In order to reduce noises, one of phases can be detected as a floating phase, and corresponding BEMF zero points are used for comparison.

However, when the motor is in a low rotation speed condition, the ON times of the PWM signal are greatly reduced, and are not enough for being used to detect zero-crossing events of the BEMF. Therefore, the existing motor driving device attempts to detect the BEMF during OFF times of the PWM signal to determine the commutation timings. However, issues relating to misjudgments of the commutation points often occur.

In general, during the ON times of the PWM, slopes of the detected coil current exhibits a positive value, which is the same as a polarity of the BEMF, and the commutation points can be correctly determined. However, in certain motor mechanisms, since the rotation speed of motors does not match the rotation speed that can be achieved by an input current for the motor, an erroneous BEMF signal may be generated, resulting in misjudgment of the commutation points.

Therefore, there is an urgent need for a motor driving device and method capable of respectively performing BEMF detections during ON and OFF times of a PWM signal in accordance with motor parameters.

SUMMARY OF THE DISCLOSURE

In response to the above-referenced technical inadequacies, the present disclosure provides a motor driving device and method capable of respectively performing BEMF detections during ON and OFF times of a PWM signal in accordance with motor parameters.

In one aspect, the present disclosure provides a motor driving device for driving a motor, the motor driving device includes a starting unit, a driving unit, a floating point selecting unit, a back electromotive force (BEMF) detecting unit and a control unit. The pulse width modulation (PWM) signal generating unit is configured to generate an input pulse width modulation (PWM) signal having a duty cycle according to a rotation speed command. The control unit is configured to receive the input PWM signal, and generate a driving signal having a plurality of phases and an output pulse width modulation (PWM) signal according to a commutation sequence and the input PWM signal. The driving unit is coupled to the control unit and the motor, and configured to drive the motor with the plurality of phases. The floating point selecting unit is coupled to the driving unit and the motor and configured to select a floating phase of the motor that is not turned on according to a driving condition of the motor. The back electromotive force (BEMF) detecting unit is configured to receive the output PWM signal, detect a back electromotive force (BEMF) of the floating phase during ON times or OFF times of the output PWM signal, and output a commutation signal in response to zero crossing events occurring in the BEMF. The control unit is configured to, in response to receiving the commutation signal, control the driving unit to switch from a current phase to a next phase according to the commutation sequence, and drive the motor with the driving signal. The control unit is configured to control the BEMF detecting unit to detect the BEMF of the floating phase during the ON times or the OFF times of the output PWM signal.

In certain embodiments, the motor driving device further includes a motor parameter detecting module configured to detect a plurality of operating parameters of the motor and correspondingly output a plurality of parameter signals. The control unit is configured to determine whether to output an OFF time detection starting signal according to the operating parameters, thereby causing the BEMF detecting unit to detect the BEMF of the floating phase during OFF times of the output PWM signal.

In certain embodiments, the motor parameter detecting module includes a duty cycle transition detecting unit configured to receive the output PWM signal and detect a duty cycle of the output PWM signal to generate a duty cycle parameter signal. The control unit is configured to receive the duty cycle parameter signal, and determine whether to output the OFF time detection starting signal according to the duty cycle of the output PWM signal.

In certain embodiments, the control unit is configured to determine to output the OFF time detection starting signal in response to the duty cycle being in a range of 6% to 10%.

In certain embodiments, the motor parameter detecting module includes an operating voltage transition detecting unit configured to receive an operating voltage to generate an operating voltage parameter signal. The control unit is configured to receive the operating voltage parameter signal, and determine whether to output the OFF time detection starting signal according to the operating voltage parameter signal.

In certain embodiments, the motor parameter detecting module includes a rotation speed transition detecting unit configured to detect a rotation speed of the motor to generate a rotation speed parameter signal. The control unit is configured to receive the rotation speed parameter signal, and determine whether to output the OFF time detection starting signal according to the rotation speed of the motor.

In certain embodiments, the control unit is configured to determine whether a rotation speed change rate of the motor is within a predetermined speed change range, and determine to output the OFF time detection starting signal in response to the rotation speed change rate of the motor being within the predetermined speed change range.

In certain embodiments, the control unit is configured to, in response to the control unit determining to output the OFF time detection starting signal according to the plurality of parameter signals, generate and output a ready signal to reset the motor parameter detecting module.

In certain embodiments, the control unit is configured to control the BEMF detecting unit to detect the BEMF of the floating phase after a mask time elapses, and output a mask time indication signal.

In certain embodiments, the motor driving device further includes a zero-crossing error detecting unit configured to receive the mask time indication signal, the commutation signal and the ready signal to determine whether the commutation signal is detected within a predetermined time after the mask time elapses when the BEMF detecting unit is detecting the BEMF of the floating phase during the OFF times of the output PWM signal. The zero-crossing error detecting unit is configured to generate an error signal in response to the commutation signal being detected within the predetermined time after the mask time elapses, and the control unit is configured to, in response to receiving the error signal, control the BEMF detecting unit to be switched to detect the BEMF of the floating phase during the ON times of the output PWM signal.

In one aspect, the present disclosure provides a motor driving method for driving a motor, the method includes the following steps: configuring a pulse width modulation (PWM) signal generating unit to generate an input pulse width modulation (PWM) signal having a duty cycle according to a rotation speed command; configuring a control unit to receive the input PWM signal, and generate a driving signal having a plurality of phases and an output pulse width modulation (PWM) signal according to a commutation sequence and the input PWM signal; configuring a driving unit to drive the motor with the plurality of phases; configuring a floating point selecting unit to select a floating phase of the motor that is not turned on according to a driving condition of the motor; configuring a back electromotive force (BEMF) detecting unit to receive the output PWM signal, detect a back electromotive force (BEMF) of the floating phase during ON times or OFF times of the output PWM signal, and output a commutation signal in response to zero crossing events occurring in the BEMF; configuring the control unit to, in response to receiving the commutation signal, control the driving unit to switch from a current phase to a next phase according to the commutation sequence, and drive the motor with the driving signal; and configuring the control unit to control the BEMF detecting unit to detect the BEMF of the floating phase during the ON times or the OFF times of the output PWM signal.

In certain embodiments, the motor driving method further includes: configuring a motor parameter detecting module to detect a plurality of operating parameters of the motor and correspondingly output a plurality of parameter signals; and configuring the control unit to determine whether to output an OFF time detection starting signal according to the operating parameters, thereby causing the BEMF detecting unit to detect the BEMF of the floating phase during OFF times of the output PWM signal.

In certain embodiments, the motor driving method further includes: configuring a duty cycle transition detecting unit of the motor parameter detecting module to receive the output PWM signal and detect a duty cycle of the output PWM signal to generate a duty cycle parameter signal; and configuring the control unit to receive the duty cycle parameter signal, and determine whether to output the OFF time detection starting signal according to the duty cycle of the output PWM signal.

In certain embodiments, the control unit is configured to determine to output the OFF time detection starting signal in response to the duty cycle being in a range of 6% to 10%.

In certain embodiments, the motor driving method further includes: configuring an operating voltage transition detecting unit configured to receive an operating voltage to generate an operating voltage parameter signal; and configuring the control unit to receive the operating voltage parameter signal, and determine whether to output the OFF time detection starting signal according to the operating voltage parameter signal.

In certain embodiments, the motor driving method further includes: configuring a rotation speed transition detecting unit of the motor parameter detecting module to detect a rotation speed of the motor to generate a rotation speed parameter signal; and configuring the control unit to receive the rotation speed parameter signal, and determine whether to output the OFF time detection starting signal according to the rotation speed of the motor.

In certain embodiments, the motor driving method further includes: configuring the control unit to determine whether a rotation speed change rate of the motor is within a predetermined speed change range, and determine to output the OFF time detection starting signal in response to the rotation speed change rate of the motor being within the predetermined speed change range.

In certain embodiments, the motor driving method further includes: configuring the control unit to, in response to the control unit determining to output the OFF time detection starting signal according to the plurality of parameter signals, generate and output a ready signal to reset the motor parameter detecting module.

In certain embodiments, the motor driving method further includes: configuring the control unit to control the BEMF detecting unit to detect the BEMF of the floating phase after a mask time elapses, and output a mask time indication signal.

In certain embodiments, the motor driving method further includes: configuring a zero-crossing error detecting unit to receive the mask time indication signal, the commutation signal and the ready signal to determine whether the commutation signal is detected within a predetermined time after the mask time elapses when the BEMF detecting unit is detecting the BEMF of the floating phase during the OFF times of the output PWM signal, and generate an error signal in response to the commutation signal being detected within the predetermined time after the mask time elapses; and configuring the control unit to, in response to receiving the error signal, control the BEMF detecting unit to be switched to detect the BEMF of the floating phase during the ON times of the output PWM signal.

Therefore, the motor driving device and method provided by the present disclosure can avoid issues that the zero-crossing events are insufficient to be used to detect the BEMF due to a large drop in the ON times of the PWM signal during a low duty cycle. Furthermore, when the operating voltage in the system is in a transition state, the control unit can be used to detect whether the change rate of the operating voltage exceeds a predetermined change rate, so as to prevent the zero-crossing events in detecting the BEMF during the OFF times of the output PWM signal from being misjudged when the operating voltage in the system is not stabilized, thereby avoiding the misjudgment of the commutation points.

Furthermore, the control unit can determine whether the rotation speed change rate of the motor is within a predetermined speed change range. When the rotation speed is stabilized, the OFF time detection starting signal can be determined to be output, so as to prevent the BEMF detection for the floating phase from being performed during the OFF times of the output PWM signal, thereby avoiding the misjudgment of the commutation points.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
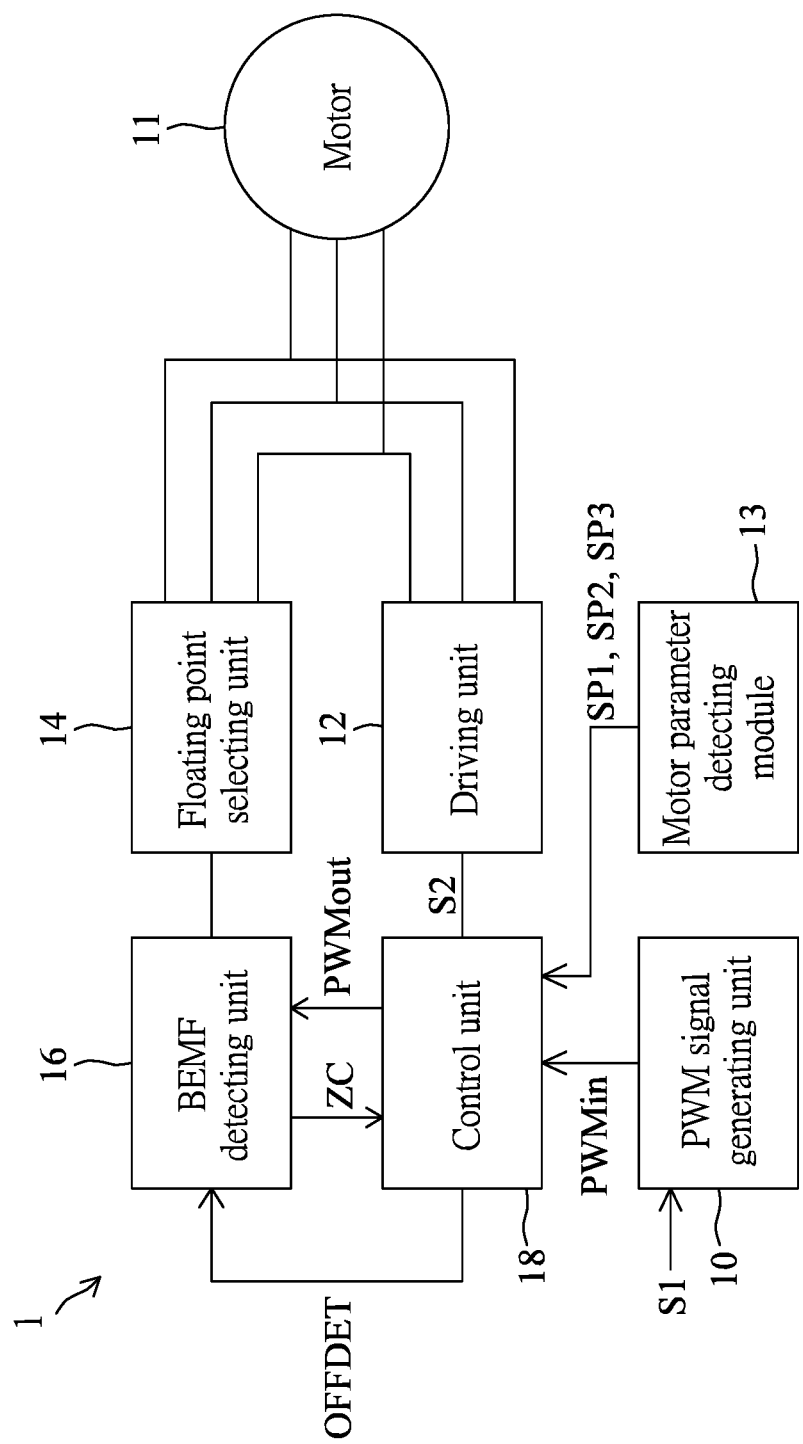
FIG. 1 is a circuit schematic diagram of a motor driving device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit schematic diagram of a motor driving device according to a first embodiment of the present disclosure.

Referring to FIG. 1, a first embodiment of the present disclosure provides a motor driving device 1 for driving a motor 11, the motor driving device 1 includes a PWM signal generating unit 10, a driving unit 12, a motor parameter detecting module 13, and a floating point selecting unit 14, a back electromotive force (BEMF) detecting unit 16 and a control unit 18. The motor 11 can be a three-phase sensorless motor.

The pulse width modulation (PWM) signal generating unit 10 is configured to generate an input pulse width modulation (PWM) signal PWMin having a duty cycle according to a rotation speed command S1.

The control unit 18 is configured to receive the input PWM signal PWMin, and generate a driving signal S2 having a plurality of phases and an output pulse width modulation (PWM) signal PWMout according to a commutation sequence and the input PWM signal PWMin.

The driving unit 12 is coupled to the control unit 18 and the motor 11 and configured to drive the motor 11 with the plurality of phases. The floating point selecting unit 14 is coupled to the driving unit 12 and the motor 11 and configured to select a floating phase of the motor 11 that is not turned on according to a driving condition of the motor 11.

Figure 2:
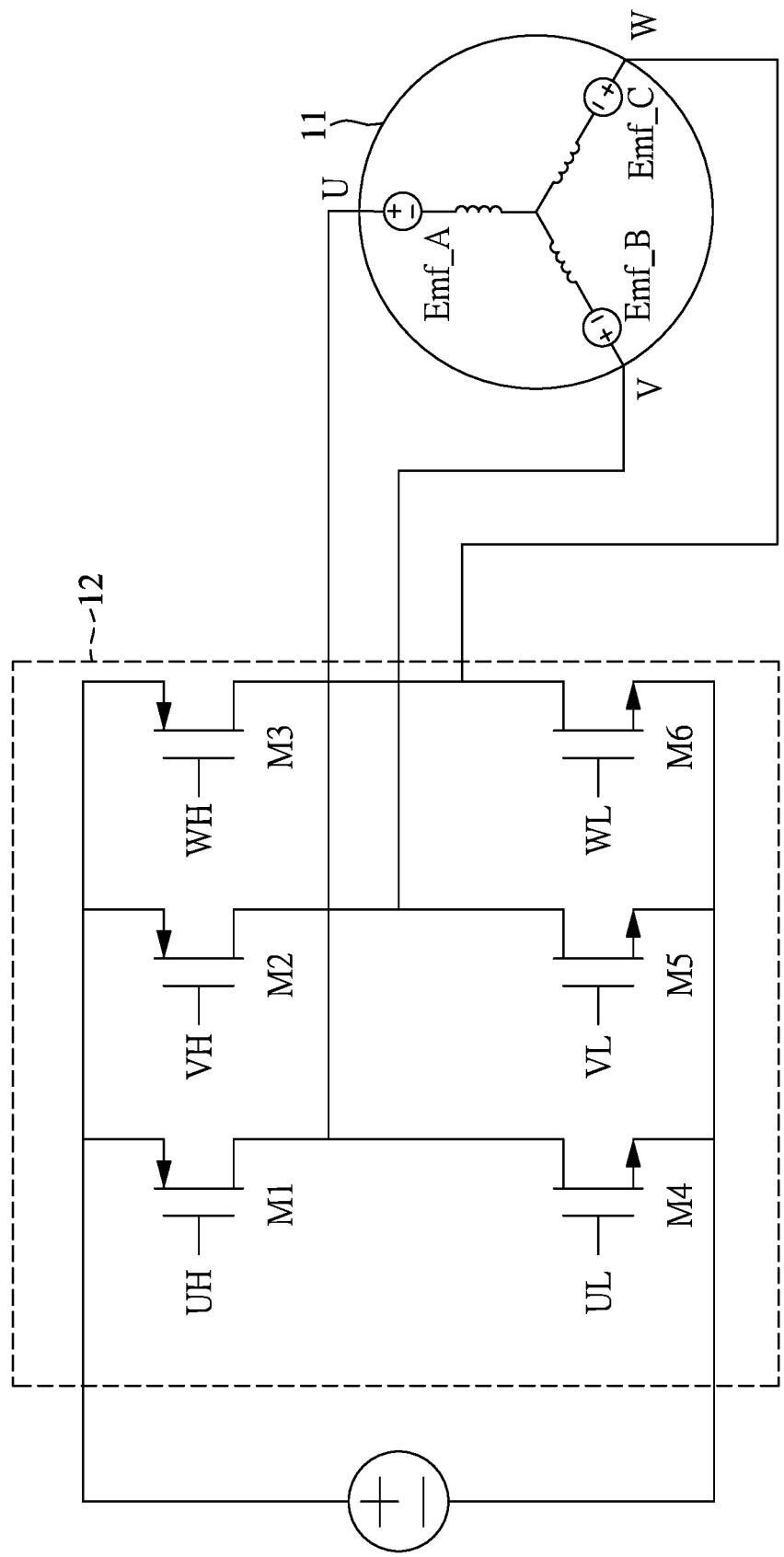
FIG. 2 is a circuit schematic diagram of a motor and a driving unit according to the first embodiment of the present disclosure.

Reference is made to FIG. 2, which is a circuit schematic diagram of a motor and a driving unit according to the first embodiment of the present disclosure. The driving unit 12 can receive the driving signal S1 to output the switching signals UH, UL, VH, VL, WH and WL, respectively, to control ON or OFF states of respective switching elements in the driving unit 12.

In general, the motor 11 has three windings, which are a U coil winding U, a V coil winding V, and a W coil winding W. As can be seen from a circuit architecture of FIG. 2, the driving unit 12 includes transistors M1, M2, M3, M4, M5, and M6. When the transistor M1 and the transistor M5 are turned on, the current of the motor is operated by the power source through the transistor. M1, the current for driving the motor 11 operated flows from the power supply terminal, through the transistor M1, the U coil winding U and the V coil winding V of the motor 11, and then flows to the ground terminal through the transistor M5.

Generally, the currents for controlling a normal motor flows from the U coil winding to the V coil winding V, the U coil winding U to the W coil winding W, and then changes the direction of the currents as flowing from the V coil winding V to the W coil winding W, the V coil winding V to the U coil winding U, and then V coil winding V to the W coil winding W. Next, other phase changes continuously control the flow direction of the current of the U coil winding U, the V coil winding V, the W coil winding W, thereby controlling the rotation direction of the motor. The phase change of the motor is described in the above embodiment, however, this is only one kind of motor phase changing control, and other methods of phase changing of the motor will not be described herein.

Furthermore, the commutation sequence can be sequentially arranged UV, UW, VW, VU, WU, and WV. According to this commutation sequence, the control unit 18 can generate the driving signal S1 having multiple phases, and the commutation sequence UV, UW, VW, VU, WU, and WV are set according to a predetermined rotation direction of the motor, such as the forward rotation direction. When the U coil winding serves as the floating phase, a BEMF generated thereby is Emf_A, when the V coil winding V serves as the floating phase, a BEMF generated thereby is Emf_B, and when the W coil winding W serves as the floating phase, a BEMF generated thereby is Emf_C.

Further, the floating point selecting unit 14 is coupled to the driving unit 12 and the motor 11 for selecting a floating phase that is not turned on in the motor 11 according to a driving condition of the driving unit 12. For example, in a case of UV in the commutation sequence, that is, the U coil winding U and the V coil winding V are turned on, and at this time, the floating phase that is not turned on in the motor 11 is the W coil winding W. In a case of UW in the commutation sequence, that is, the U coil winding U and the W coil winding W are turned on, and at this time, the floating phase that is not turned on in the motor 11 is the V coil winding V.

The BEMF detecting unit 16 is coupled to the floating point selecting unit 14 and configured to receive the output PWM signal PWMout, detect a back electromotive force (BEMF) of the floating phase during ON times or OFF times of the output PWM signal PWMout, and output a commutation signal ZC in response to zero crossing events occurring in the BEMF. For example, in a case of UV in the commutation sequence, that is, the U coil winding U and the V coil winding V are turned on, the BEMF detecting unit 16 can be set to detect one of the floating phases of the motor, such as the coil winding W, to determine whether a zero-crossing event has occurred. When the zero-crossing event occurs, the BEMF detecting unit 16 generates the commutation signal ZC and transmits it to the control unit 18.

When the control unit 18 receives the commutation signal ZC, the control driving unit 12 switches a current phase to a next phase according to the commutation sequence, and drives the motor 11 by the driving signal S2.

The control unit 18 can be used to control the BEMF detecting unit 16 to detect the BEMF of the floating phase under the ON times or the OFF times of the output PWM signal PWMout.

Figure 3:
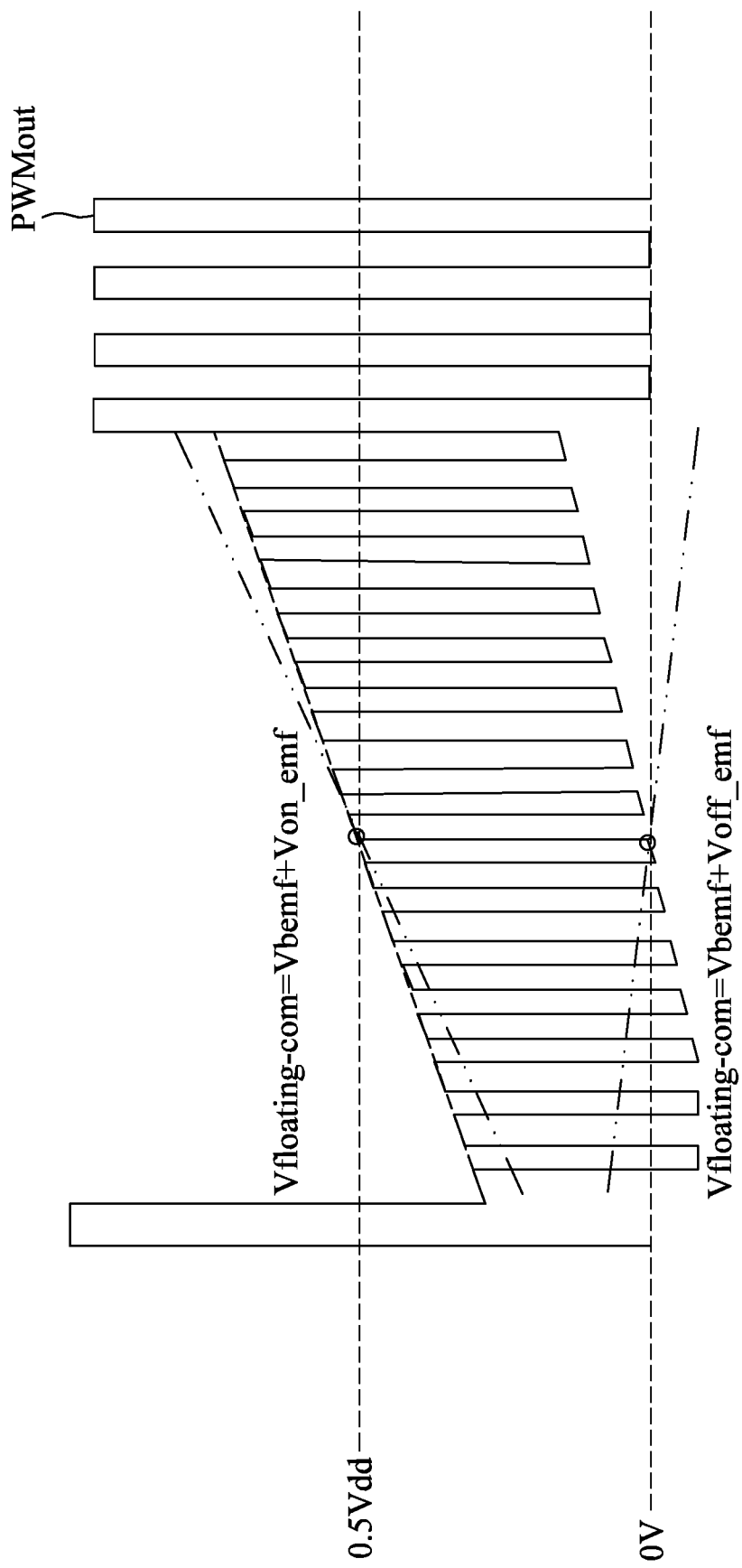
FIG. 3 is a schematic diagram of detecting a BEMF of a floating phase during ON times or OFF times of an output PWM signal according to the first embodiment of the present disclosure.

Reference is further made to FIG. 3, which is a schematic diagram of detecting a BEMF of a floating phase during ON times or OFF times of an output PWM signal according to the first embodiment of the present disclosure. As shown in FIG. 3, the floating phase voltage Vfloating-com is a sum of a BEMF of the coil Vbemf and the output PWM signal voltage Von_emf during the ON times, that is, Vfloating-com=Vbemf+Von_emf. Before the zero-crossing event ZCP of the BEMF occurs, assuming that the BEMF of the coil Vbemf is −0.5V, and the output PWM signal voltage Von_emf is −1V during ON times, the floating phase voltage Vfloating-com can be derived to be −1.5V. When the zero-crossing event ZCP of the BEMF occurs, the BEMF of the coil Vbemf is 0V, and the PWM signal voltage Von_emf is 0V during the ON times. After the zero-crossing event ZCP of the BEMF occurs, assuming that the BEMF of the coil Vbemf is 0.5V, and the output PWM signal voltage Von_emf is 1V during the ON times, the floating phase voltage Vfloating-com can be derived to be 1.5V. In other words, when the BEMF is detected during the ON times of the output PWM signal PWMout, slopes of the detected coil current exhibit a positive value, which is the same as a polarity of the BEMF, and therefore the determination for the commutation points is correct.

However, when the motor is in a low rotation speed condition, the ON times of the PWM signal are greatly reduced, and are not enough for being used to detect zero-crossing events of the BEMF. Therefore, OFF times of the PWM signal are required as a reference for determining the commutation points. As shown in FIG. 3, the floating phase voltage Vfloating-com is a sum of a BEMF of the coil Vbemf and the output PWM signal voltage Voff_emf during the OFF times, that is, Vfloating-com=Vbemf+Voff_emf. Before the zero-crossing event ZCP of the BEMF occurs, assuming that the BEMF of the coil Vbemf is −0.5V, and the output PWM signal voltage Voff_emf is +1V during OFF times, the floating phase voltage Vfloating-com can be derived to be +0.5V. When the zero-crossing event ZCP of the BEMF occurs, the BEMF of the coil Vbemf is 0V, and the PWM signal voltage Voff_emf is 0V during the OFF times. After the zero-crossing event ZCP of the BEMF occurs, assuming that the BEMF of the coil Vbemf is 0.5V, and the output PWM signal voltage Voff_emf is −1V during the OFF times, the floating phase voltage Vfloating-com can be derived to be −0.5V. In other words, when the BEMF is detected during the OFF times of the output PWM signal PWMout, slopes of the detected coil current exhibit a negative value, which is opposite to a polarity of the BEMF. Therefore, when the rotation speed falls behind the coil current with a predetermined phase, the induced BEMF is small, so that an error can easily occur in comparing the BEMF of the floating phase, resulting in misjudgment for the commutation points.

Therefore, the motor driving device 1 of the present disclosure further includes a motor parameter detecting module 13 configured to detect a plurality of operating parameters of the motor 11 and correspondingly output a plurality of parameter signals SP1, SP2, and SP3. The control unit 18 can determine whether to output an OFF time detection starting signal OFFDET according to the operating parameters, thereby causing the BEMF detecting unit 16 to detect the BEMF of the floating phase during OFF times of the output PWM signal PWMout.

Figure 4:
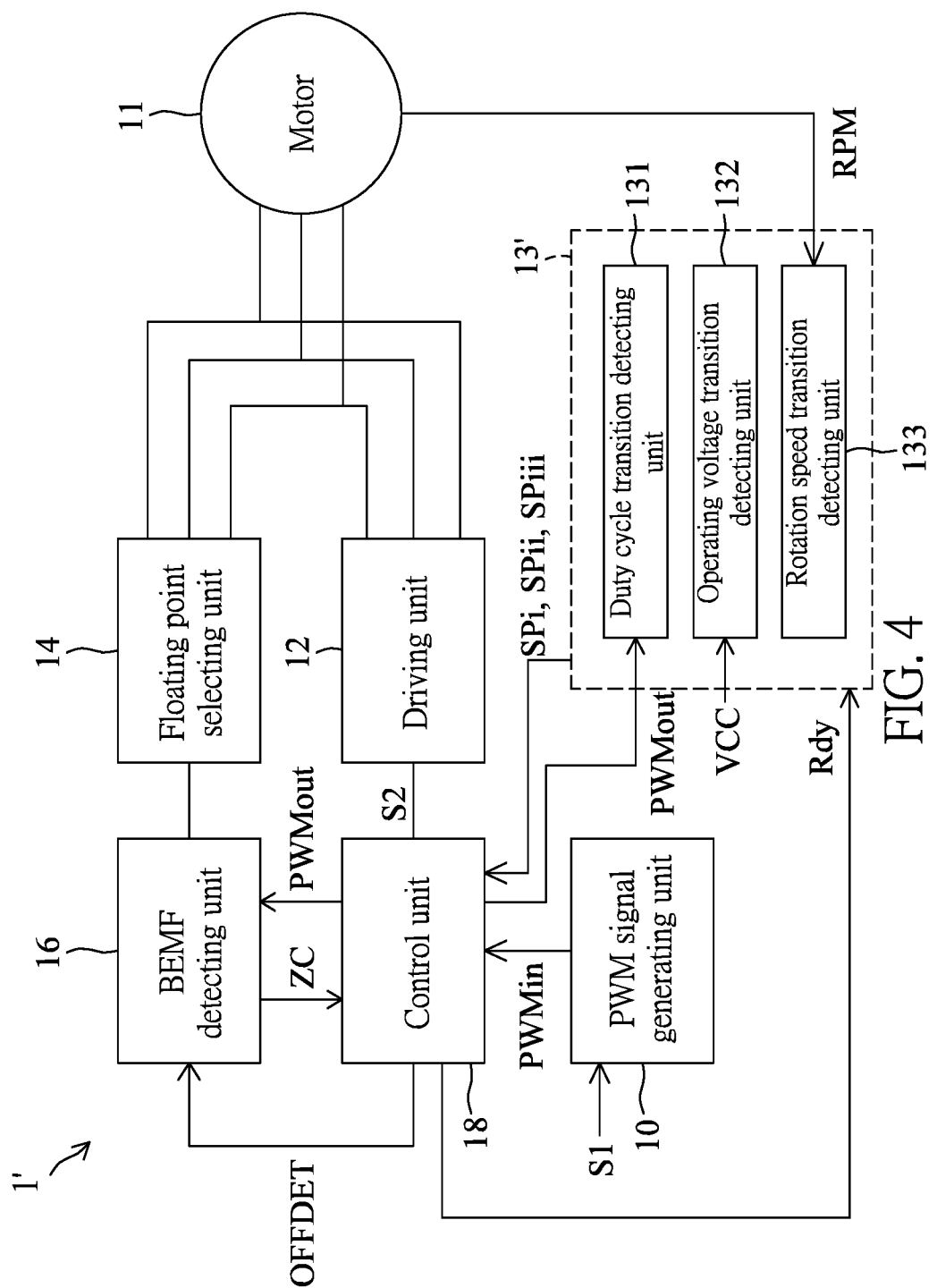
FIG. 4 is a circuit schematic diagram of a motor driving device according to a second embodiment of the present disclosure.

Reference is made to FIG. 4, which is a circuit schematic diagram of a motor driving device according to a second embodiment of the present disclosure.

The second embodiment of the present disclosure further provides a motor driving device 1' for driving a motor 11, the motor driving device 1' includes a PWM signal generating unit 10, a driving unit 12, a motor parameter detecting module 13', a floating point selecting unit 14, a BEMF detecting unit 16 and a control unit 18. The motor 11 can be a three-phase sensorless motor.

The operations of the PWM signal generating unit 10, the driving unit 12, the floating point selecting unit 14, and the BEMF detecting unit 16 is similar to those in the first embodiment of the present disclosure, and the repeated descriptions are omitted hereinafter.

The difference from the first embodiment is that the motor parameter detecting module 13' further includes a duty cycle transition detecting unit 131, an operating voltage transition detecting unit 132, and a rotation speed transition detecting unit 133.

In this embodiment, the duty cycle transition detecting unit 131 is configured to receive the output PWM signal PWMout and detect a duty cycle of the output PWM signal PWMout to generate a duty cycle parameter signal SPi. The control unit 18 is configured to receive the duty cycle parameter signal SPi, and determine whether to output the OFF time detection starting signal OFFDET according to the duty cycle of the output PWM signal PWMout.

For example, when the duty cycle is in the range of 6% to 10%, the control unit 18 determines the output OFF time detection starting signal OFFDET to avoid issues that the zero-crossing events are insufficient to be used to detect the BEMF due to a large drop in the ON times of the PWM signal during a low duty cycle.

On the other hand, the operating voltage transition detecting unit 132 can be configured to receive an operating voltage (for example, inter-chips voltage Vdd or VCC) to generate an operating voltage parameter signal SPii. After receiving the operating voltage parameter signal SPii, the control unit 18 determines whether to output the OFF time detection starting signal OFFDET according to the operating voltage parameter signal SPii. For example, when the operating voltage in the system is in transition, the control unit 18 can be used to detect whether a change rate of the operating voltage exceeds a predetermined change rate, so as to prevent the zero-crossing events in detecting the BEMF during the OFF times of the output PWM signal PWMout from being misjudged when the operating voltage in the system is not stabilized, thereby avoiding the misjudgment of the commutation points.

In addition, the rotation speed transition detecting unit can detect a rotation speed of the motor 11 by receiving a rotation speed signal RPM to generate a rotation speed parameter signal SPiii. After receiving the rotation speed parameter signal SPiii, the control unit 18 can determine whether to output the OFF time detection starting signal OFFDET according to the rotation speed of the motor 11. For example, the control unit 18 can determine whether the rotation speed change rate of the motor 11 is within the predetermined speed change range in the present embodiment. If the rotation speed change rate of the motor 11 is within the predetermined speed change range, which means that the rotation speed is stabilized, the OFF time detection starting signal OFFDET can be determined to be output, so as to prevent the BEMF detection for the floating phase from being performed during the OFF times of the output PWM signal PWMout when the rotation speed of the motor 11 is not stabilized, thereby avoiding the misjudgment of the commutation points.

It should be noted that when the control unit 18 determines to output the OFF time detection starting signal OFFDET according to the above-mentioned parameter signals SP1, SP2, SP3 (or the duty cycle parameter signal SPi, the working voltage parameter signal SPii and the rotation speed parameter signal SPiii), a ready signal Rdy is generated and output to reset the motor parameter detecting module 13'.

Figure 5:
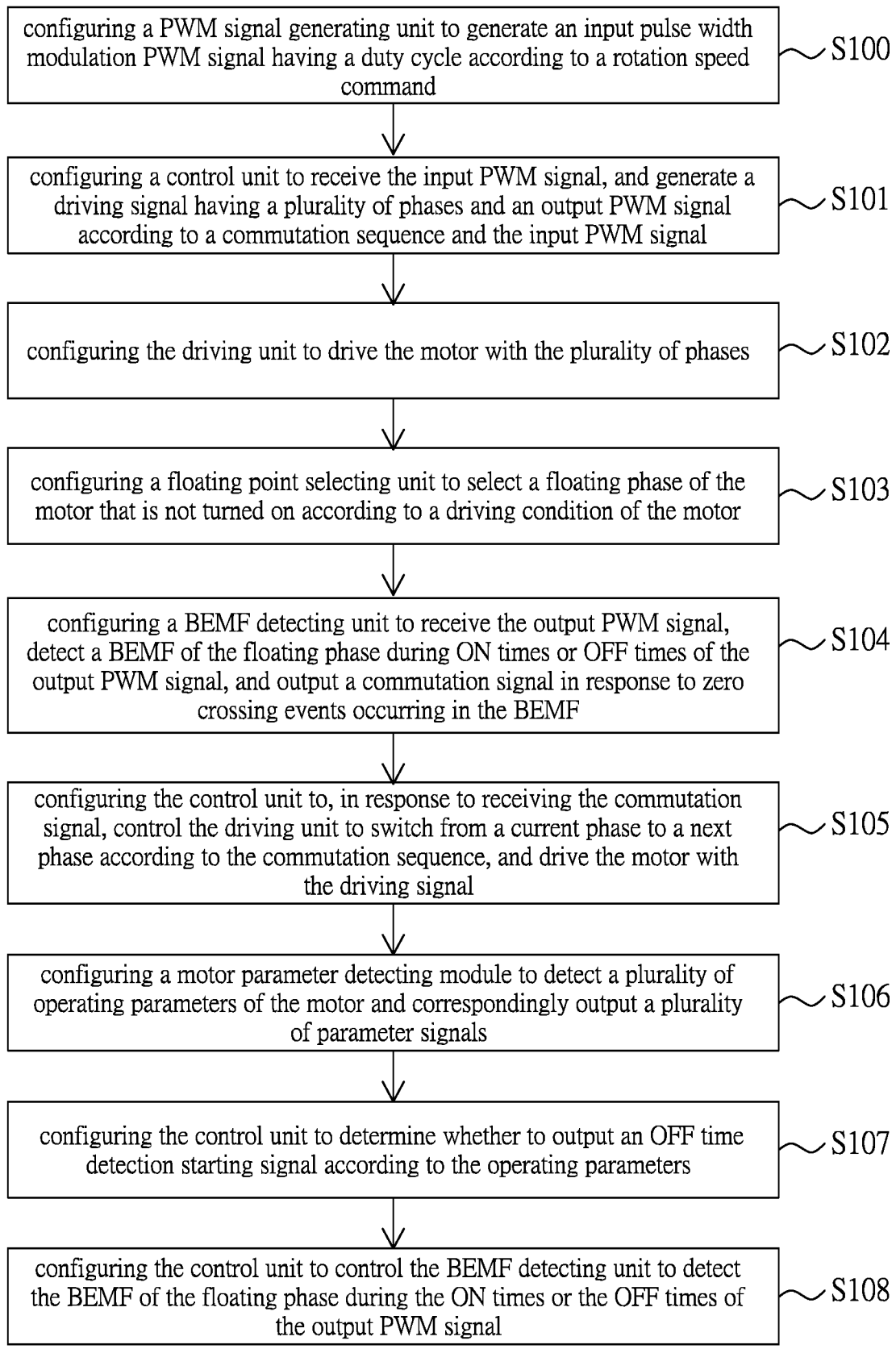
FIG. 5 is a flow chart showing a motor driving method according to the second embodiment of the present disclosure.

Reference is made to FIG. 5, which is a flow chart showing a motor driving method according to a second embodiment of the present disclosure. As shown in FIG. 5, the second embodiment of the present disclosure provides a motor driving method applicable to the motor driving device described above, but is not limited thereto, and the repeated descriptions of the operational details of the components of the motor driving device will be omitted for convenience of explanation. The motor driving method includes the following steps:

Step S100: configuring a pulse width modulation (PWM) signal generating unit to generate an input pulse width modulation (PWM) signal having a duty cycle according to a rotation speed command.

Step S101: configuring a control unit to receive the input PWM signal, and generate a driving signal having a plurality of phases and an output pulse width modulation (PWM) signal according to a commutation sequence and the input PWM signal.

S102: configuring the driving unit to drive the motor with the plurality of phases.

Step S103: configuring a floating point selecting unit to select a floating phase of the motor that is not turned on according to a driving condition of the motor.

Step S104: configuring a back electromotive force (BEMF) detecting unit to receive the output PWM signal, detect a back electromotive force (BEMF) of the floating phase during ON times or OFF times of the output PWM signal, and output a commutation signal in response to zero crossing events occurring in the BEMF.

Step S105: configuring the control unit to, in response to receiving the commutation signal, control the driving unit to switch from a current phase to a next phase according to the commutation sequence, and drive the motor with the driving signal.

Step S106: configuring a motor parameter detecting module to detect a plurality of operating parameters of the motor and correspondingly output a plurality of parameter signals.

Step S107: configuring the control unit to determine whether to output an OFF time detection starting signal according to the operating parameters, thereby causing the BEMF detecting unit to detect the BEMF of the floating phase during OFF times of the output PWM signal.

Step S108: configuring the control unit to control the BEMF detecting unit to detect the BEMF of the floating phase during the ON times or the OFF times of the output PWM signal.

Figure 6:
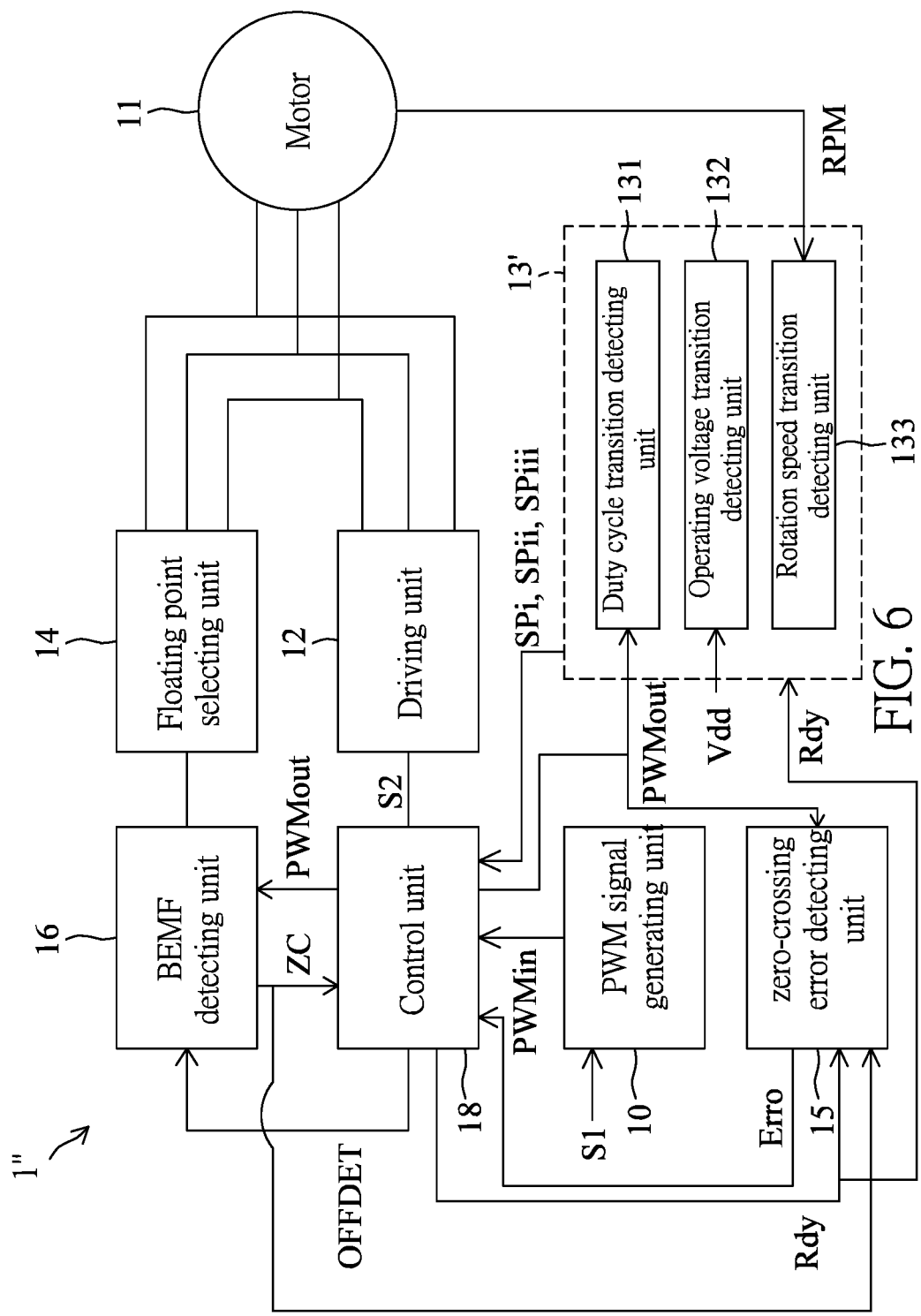
FIG. 6 is a circuit schematic diagram of a motor driving device according to a third embodiment of the present disclosure.

Reference is made to FIG. 6, which is a circuit schematic diagram of a motor driving device according to a third embodiment of the present disclosure.

The third embodiment of the present disclosure provides a motor driving device 1" for driving a motor 11, the motor driving device 1" includes a PWM signal generating unit 10, a driving unit 12, a motor parameter detecting module 13', a floating point selecting unit 14, a back electromotive force (BEMF) detecting unit 16, a control unit 18 and a zero-crossing error detecting unit 15. The motor 11 can be a three-phase sensorless motor.

The operations of the PWM signal generating unit 10, the driving unit 12, the motor parameter detecting module 13', the floating point selecting unit 14, and the BEMF detecting unit 16 is similar to those in the first and second embodiments of the present disclosure, and repeated descriptions thereof are omitted hereinafter.

The difference from the foregoing embodiments is that the control unit 18 further controls the BEMF detecting unit 16 to detect the BEMF of the floating phase after a mask time elapses, and outputs a mask time indication signal after receiving the commutation signal ZC. The mask time is designed to avoid misjudgment of the BEMF voltage level when the floating phase is switched and the stable voltage is not reached.

The motor driving device 1" further includes a zero-crossing error detecting unit 15 configured to receive the mask time indication signal mask, the commutation signal ZC and the ready signal Rdy to determine whether the commutation signal is detected within a predetermined time after the mask time elapses when the BEMF detecting unit 16 is detecting the BEMF of the floating phase during the OFF times of the output PWM signal PWMout. If the commutation signal ZC is detected within the predetermined time after the mask time elapses, which means that the motor 11 is in a fault state, the zero-crossing error detecting unit 15 would be configured to generate an error signal Erro, and the control unit 18 would be configured to, in response to receiving the error signal Erro, control the BEMF detecting unit 16 to be switched to detect the BEMF of the floating phase during the ON times of the output PWM signal PWMout.

It should be noted that, in various embodiments of the present disclosure, the ready signal Rdy is generated based on a plurality of motor parameters and can be used to indicate that the motor 11 falls behind the coil current by a phase within an acceptable phase, or the ready signal Rdy can be a signal indicating that the rotation speed of the motor 11 has stabilized and generated after a predetermined period of time, or an indication signal generated after the motor 11 is operated for one cycle after the commutation signal ZC is generated. In addition, if the duty cycle of the output PWM signal PWMout is smaller than a minimum duty cycle that can be detected during the ON times, for example, 10%, the ready signal Rdy is generated after the duty cycle is greater than 10% and the rotation speed is stabilized.

Figure 7:
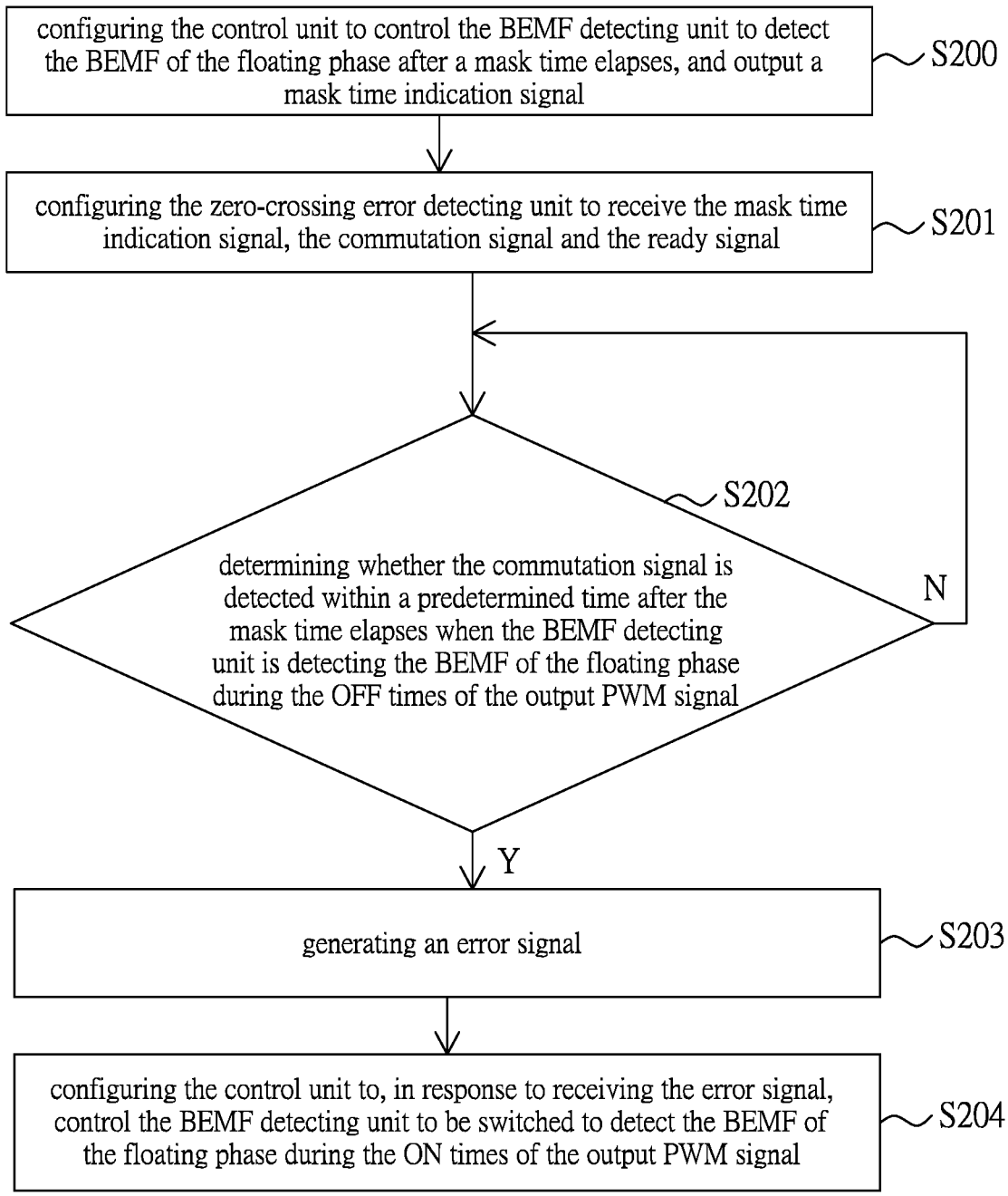
FIG. 7 is a flow chart showing a motor driving method according to the third embodiment of the present disclosure.

Reference is made to FIG. 7, which is a flow chart showing a motor driving method according to the third embodiment of the present disclosure. As shown in FIG. 7, based on the motor driving method of the second embodiment, the motor driving method of the embodiment may further include the following steps:

Step S200: configuring the control unit to control the BEMF detecting unit to detect the BEMF of the floating phase after a mask time elapses, and output a mask time indication signal.

Step S201: configuring the zero-crossing error detecting unit to receive the mask time indication signal, the commutation signal and the ready signal.

Step S202: determining whether the commutation signal is detected within a predetermined time after the mask time elapses when the BEMF detecting unit is detecting the BEMF of the floating phase during the OFF times of the output PWM signal. In response to the commutation signal being detected within the predetermined time after the mask time elapses, the method proceeds to step S203: generating an error signal. In response to the commutation signal being not detected within the predetermined time after the mask time elapses, the method repeats step S202.

Step S204: configuring the control unit to, in response to receiving the error signal, control the BEMF detecting unit to be switched to detect the BEMF of the floating phase during the ON times of the output PWM signal.

In conclusion, the motor driving device and method provided by the present disclosure can avoid issues that the zero-crossing events are insufficient to be used to detect the BEMF due to a large drop in the ON times of the PWM signal during a low duty cycle. Furthermore, when the operating voltage in the system is in a transition state, the control unit can be used to detect whether the change rate of the operating voltage exceeds a predetermined change rate, so as to prevent the zero-crossing events in detecting the BEMF during the OFF times of the output PWM signal from being misjudged when the operating voltage in the system is not stabilized, thereby avoiding the misjudgment of the commutation points.

Furthermore, the control unit can determine whether the rotation speed change rate of the motor is within a predetermined speed change range. When the rotation speed is stabilized, the OFF time detection starting signal can be determined to be output, so as to prevent the BEMF detection for the floating phase from being performed during the OFF times of the output PWM signal, thereby avoiding the misjudgment of the commutation points.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driving device for driving a motor, comprising:
   a pulse width modulation (PWM) signal generating unit configured to generate an input pulse width modulation (PWM) signal having a duty cycle according to a rotation speed command;
   a control unit configured to receive the input PWM signal, and generate a driving signal having a plurality of phases and an output pulse width modulation (PWM) signal according to a commutation sequence and the input PWM signal;
   a driving unit coupled to the control unit and the motor, configured to drive the motor with the plurality of phases;
   a floating point selecting unit coupled to the driving unit and the motor and configured to select a floating phase of the motor that is not turned on according to a driving condition of the motor; and
   a back electromotive force (BEMF) detecting unit configured to receive the output PWM signal, detect a back electromotive force (BEMF) of the floating phase during ON times or OFF times of the output PWM signal, and output a commutation signal in response to zero crossing events occurring in the BEMF;

wherein the control unit is configured to, in response to receiving the commutation signal, control the driving unit to switch from a current phase to a next phase according to the commutation sequence, and drive the motor with the driving signal, and wherein the control unit is configured to control the BEMF detecting unit to detect the BEMF of the floating phase during the ON times or the OFF times of the output PWM signal.

2. The motor driving device according to claim 1, further comprising a motor parameter detecting module configured to detect a plurality of operating parameters of the motor and correspondingly output a plurality of parameter signals, wherein the control unit is configured to determine whether to output an OFF time detection starting signal according to the operating parameters, thereby causing the BEMF detecting unit to detect the BEMF of the floating phase during OFF times of the output PWM signal.

3. The motor driving device according to claim 2, wherein the motor parameter detecting module includes a duty cycle transition detecting unit configured to receive the output PWM signal and detect a duty cycle of the output PWM signal to generate a duty cycle parameter signal, wherein the control unit is configured to receive the duty cycle parameter signal, and determine whether to output the OFF time detection starting signal according to the duty cycle of the output PWM signal.

4. The motor driving device according to claim 3, wherein the control unit is configured to determine to output the OFF time detection starting signal in response to the duty cycle being in a range of 6% to 10%.

5. The motor driving device according to claim 2, wherein the motor parameter detecting module includes an operating voltage transition detecting unit configured to receive an operating voltage to generate an operating voltage parameter signal, wherein the control unit is configured to receive the operating voltage parameter signal, and determine whether to output the OFF time detection starting signal according to the operating voltage parameter signal.

6. The motor driving device according to claim 2, wherein the motor parameter detecting module includes a rotation speed transition detecting unit configured to detect a rotation speed of the motor to generate a rotation speed parameter signal, wherein the control unit is configured to receive the rotation speed parameter signal, and determine whether to output the OFF time detection starting signal according to the rotation speed of the motor.

7. The motor driving device according to claim 6, wherein the control unit is configured to determine whether a rotation speed change rate of the motor is within a predetermined speed change range, and determine to output the OFF time detection starting signal in response to the rotation speed change rate of the motor being within the predetermined speed change range.

8. The motor driving device according to claim 2, wherein when the control unit determines to output the OFF time detection starting signal according to the plurality of parameter signals, the control unit generates and outputs a ready signal to reset the motor parameter detecting module.

9. The motor driving device according to claim 8, wherein the control unit is configured to control the BEMF detecting unit to detect the BEMF of the floating phase after a mask time elapses, and output a mask time indication signal.

10. The motor driving device according to claim 9, further comprising a zero-crossing error detecting unit configured to receive the mask time indication signal, the commutation signal and the ready signal to determine whether the commutation signal is detected within a predetermined time after the mask time elapses when the BEMF detecting unit is detecting the BEMF of the floating phase during the OFF times of the output PWM signal, wherein the zero-crossing error detecting unit is configured to generate an error signal in response to the commutation signal being detected to be within the predetermined time after the mask time elapses, and the control unit is configured to, in response to receiving the error signal, control the BEMF detecting unit to be switched to detect the BEMF of the floating phase during the ON times of the output PWM signal.

11. A motor driving method for driving a motor, the method comprising the following steps:

configuring a pulse width modulation (PWM) signal generating unit to generate an input pulse width modulation (PWM) signal having a duty cycle according to a rotation speed command;

configuring a control unit to receive the input PWM signal, and generate a driving signal having a plurality of phases and an output pulse width modulation (PWM) signal according to a commutation sequence and the input PWM signal;

configuring a driving unit to drive the motor with the plurality of phases;

configuring a floating point selecting unit to select a floating phase of the motor that is not turned on according to a driving condition of the motor;

configuring a back electromotive force (BEMF) detecting unit to receive the output PWM signal, detect a back electromotive force (BEMF) of the floating phase during ON times or OFF times of the output PWM signal, and output a commutation signal in response to zero crossing events occurring in the BEMF;

configuring the control unit to, in response to receiving the commutation signal, control the driving unit to switch from a current phase to a next phase according to the commutation sequence, and drive the motor with the driving signal; and configuring the control unit to control the BEMF detecting unit to detect the BEMF of the floating phase during the ON times or the OFF times of the output PWM signal.

12. The motor driving method according to claim 11, further comprising:

configuring a motor parameter detecting module to detect a plurality of operating parameters of the motor and correspondingly output a plurality of parameter signals; and configuring the control unit to determine whether to output an OFF time detection starting signal according to the operating parameters, thereby causing the BEMF detecting unit to detect the BEMF of the floating phase during OFF times of the output PWM signal.

13. The motor driving method according to claim 12, further comprising:

configuring a duty cycle transition detecting unit of the motor parameter detecting module to receive the output PWM signal and detect a duty cycle of the output PWM signal to generate a duty cycle parameter signal; and configuring the control unit to receive the duty cycle parameter signal, and determine whether to output the OFF time detection starting signal according to the duty cycle of the output PWM signal.

14. The motor driving method according to claim 3, further comprising configuring the control unit to determine to output the OFF time detection starting signal in response to the duty cycle being in a range of 6% to 10%.

15. The motor driving method according to claim 12, further comprising:
configuring an operating voltage transition detecting unit configured to receive an operating voltage to generate an operating voltage parameter signal; and
configuring the control unit to receive the operating voltage parameter signal, and determine whether to output the OFF time detection starting signal according to the operating voltage parameter signal.

16. The motor driving method according to claim 12, further comprising:
configuring a rotation speed transition detecting unit of the motor parameter detecting module to detect a rotation speed of the motor to generate a rotation speed parameter signal; and
configuring the control unit to receive the rotation speed parameter signal, and determine whether to output the OFF time detection starting signal according to the rotation speed of the motor.

17. The motor driving method according to claim 16, further comprising:
configuring the control unit to determine whether a rotation speed change rate of the motor is within a predetermined speed change range, and determine to output the OFF time detection starting signal in response to the rotation speed change rate of the motor being within the predetermined speed change range.

18. The motor driving method according to claim 12, further comprising:
configuring the control unit to, in response to the control unit determining to output the OFF time detection starting signal according to the plurality of parameter signals, generate and output a ready signal to reset the motor parameter detecting module.

19. The motor driving method as described in claim 18, further comprising:
configuring the control unit to control the BEMF detecting unit to detect the BEMF of the floating phase after a mask time elapses, and output a mask time indication signal.

20. The motor driving method as described in claim 19, further comprising:
configuring a zero-crossing error detecting unit to receive the mask time indication signal, the commutation signal and the ready signal to determine whether the commutation signal is detected within a predetermined time after the mask time elapses when the BEMF detecting unit is detecting the BEMF of the floating phase during the OFF times of the output PWM signal, and generate an error signal in response to the commutation signal being detected within the predetermined time after the mask time elapses; and
configuring the control unit to, in response to receiving the error signal, control the BEMF detecting unit to be switched to detect the BEMF of the floating phase during the ON times of the output PWM signal.

* * * * *